June 15, 1937. L. O. E. ROESSEL 2,083,922
RAKE
Filed Dec. 19, 1935
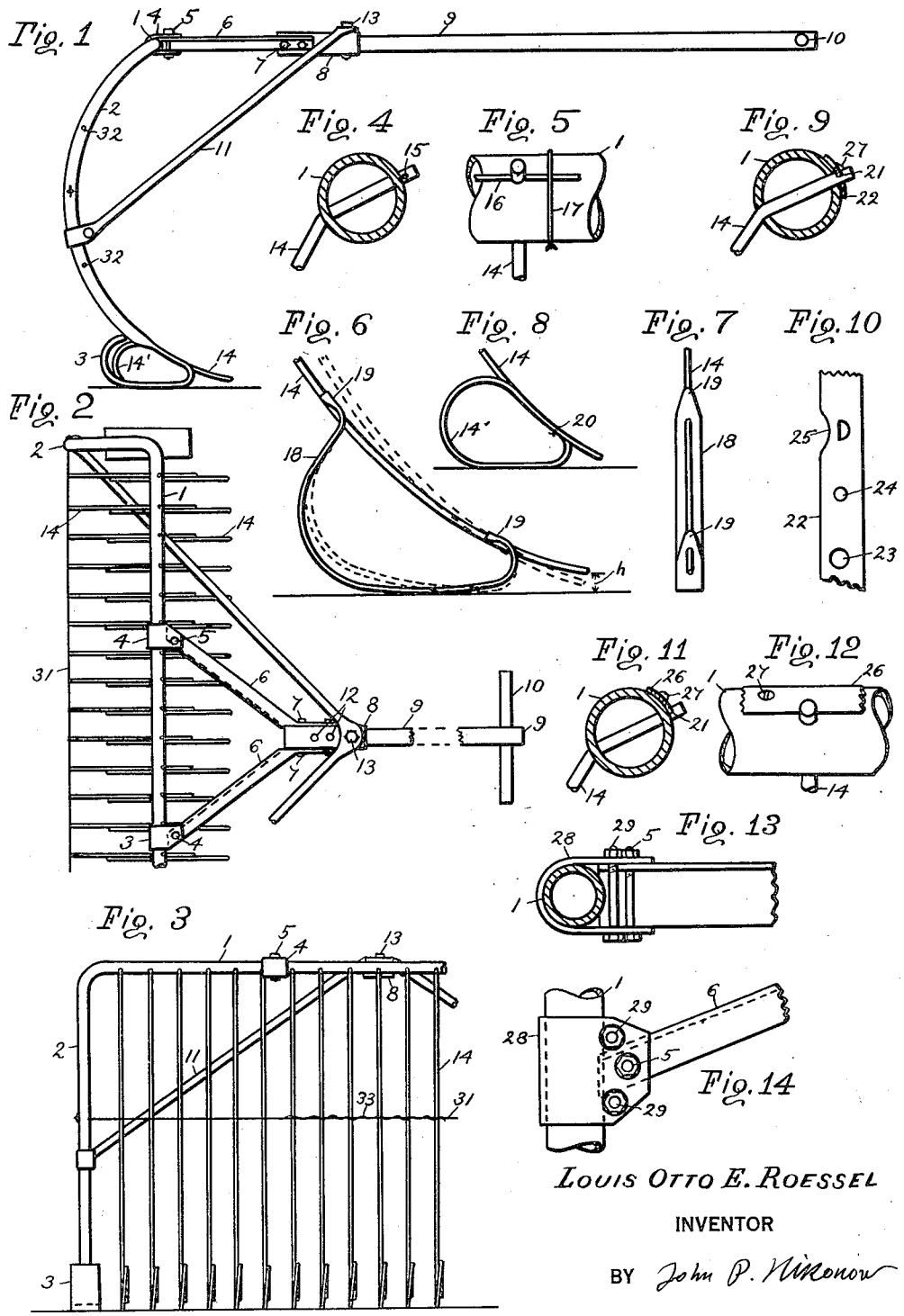
Louis Otto E. Roessel
INVENTOR
BY John P. Nixonow
ATTORNEY Patented June 15, 1937

2,083,922

UNITED STATES PATENT OFFICE 2,083,922

RAKE

Louis Otto E. Roessel, Chappaqua, N. Y.

Application December 19, 1935, Serial No. 55,141

2 Claims. (Cl. 55—10)

My invention relates to rakes and has particular reference to lawn rakes adapted for manual operation in gathering cut grass, leaves etc.

The object of my invention is to provide a rake having curved resilient teeth adapted to pick up and gather light, bulky refuse on lawns in gardens, fairways on golf courses, etc.

Another object of my invention is to provide a rake with curved teeth having shoes back of the teeth for keeping the points of the teeth at a certain elevation above the ground so as to prevent their digging into the earth, but sufficient for gathering bulky refuse.

Another object of my invention is to provide a simple and light frame for the rake with feet adapted to slide over the ground.

Another object of my invention is to provide a handle for the frame adjustably clamped to the upper bar of the frame, so that by changing the angle of the handle on the frame it is possible to change the inclination of the teeth and thereby their elevation above the ground.

Another object of my invention is to provide a simple and effective means for attaching the upper ends of the teeth to the frame so as to prevent their axial and rotational movement.

Another object of my invention is to provide a flexible lacing for the teeth so as to stiffen them and to keep them separated at required distances apart, also means for changing or adjusting the vertical position of the lacing so as to regulate the degree of stiffness of the row of teeth, the ends of the lacing wire being fastened in holes in the legs of the frame.

My invention is more fully described in the accompanying specification and drawing in which—

Fig. 1 is a side view of my rake, Fig. 2 is a partial top plan view of the same, Fig. 3 is a partial end view of the same, Fig. 4 is a detail view of the rake frame in section with the upper end of a tooth, Fig. 5 is another view of the same, Fig. 6 is a detail view of a loop or shoe formed at the lower end of a rake tooth, Fig. 7 is another view of the same, Fig. 8 is a detail view of a modified construction of the loop, Fig. 9 is a detail view of a modified arrangement for fastening the upper ends of the teeth to the frame, Fig. 10 is a detail view of a tooth holding strip for the modification shown in Fig. 9, Fig. 11 is another modification of the device for holding teeth in the frame, Fig. 12 is another view of the same, Fig. 13 is a detail view of a clamp fastening a handle to the frame, and Fig. 14 is another view of the same.

My rake consists of a frame 1 preferably made of an iron pipe and having curved legs 2 also made of a pipe. The lower ends of the legs are flattened and bent into loop-shaped shoes 3. The lower portions of the shoes are flattened or slightly curved so as to be adapted to slide over the ground. The frame 1 has clamps 4 with bolts 5 passing through the ends of angle bars 6. The other ends of the bars 6 are attached by bolts 7 to a ferrule 8 into which a wooden handle bar 9 is fitted. The other end of the bar 9 has a short cross-bar 10 serving as a handle. Tubular braces 11 extend from the top of the ferrule 8 to the middle portions of the legs 2 for stiffening the frame with the legs. The ferrule 8 has several holes 12 for a bolt 13 fastening the braces to the ferrule for different angles between the handle bar 9 and the legs 2.

The frame 1 is drilled at regular distances apart for the ends of teeth 14. The teeth are preferably made of a steel wire properly hardened and tempered so as to have the required stiffness and resiliency. The teeth are bent at the point of entrance into the frame as shown in Fig. 4 thereby preventing any further upward sliding of the ends of the teeth in the holes. The upper ends of the teeth projecting outside of the frame have transversely drilled small holes 15 for a steel wire 16. The latter is fastened in a few places to the frame by wire loops 17. The wire 16 retains the teeth in their position in the frame and at the same time prevents turning or rotational movement of the teeth. The teeth are curved substantially into the same shape as the legs, having their lower ends directed forward at an angle so as to facilitate gathering the refuse into the concave space formed by the teeth with the legs.

The lower ends of the teeth are provided with loop-shaped shoes 18 made of flat strips of metal and provided with drilled holes near the ends for the teeth. The ends of the strips are bent back and clamped over the wire at 19. The clamped portions are then soldered or brazed to the wire. The lower portions of the shoes are made flat or slightly curved as shown in Fig. 6 in order to facilitate their sliding over the ground. The shoes are further shaped so as to keep the ends of the teeth above the ground thereby preventing them from digging into the ground when the rake is being dragged for gathering the refuse. The elevation of the teeth "h" can be varied by changing the angle between the handle bar 9 and the frame 1 thereby changing the angle formed by the teeth with the ground as shown with dotted lines in Fig. 6. Instead of being flat as shown in Fig. 8, the lower side of a shoe may be slightly curved as shown in Fig. 6, in order to be better adapted for sliding over the ground with different adjustments of the rake as shown in dotted lines. Slightly curved lower side of the shoes permits them to slide easily with different adjustments of the teeth.

The shoes may be also formed by bending the wire out of which the teeth are made into a loop as shown in Fig. 8. The two parallel wires at the lower portion of the loop may be tied together by a short piece of wire 20.

A modified method of attaching the teeth to the frame is shown in Figs. 9 and 10. The ends of the teeth in this case are undercut or provided with sawcuts 21 at the point of emergence from the frame. A clamping strip 22 is provided with holes 23 for the ends of the teeth and is curved to conform to the outer surface of the frame. The strip is fastened to the frame by wire loops or screws fitted into holes 24 and screwed into the frame. After assembling the strip in place, its sides opposite the slots 21 are hammered or punched into the slots, taking shape shown at 25 in Fig. 10. The portions of the strip or bridges forced into the slots form locks for keeping the teeth in position and preventing them from turning in the frame.

A similar arangement is shown in Figs. 11 and 12, in which the slots 21 in the teeth are engaged by the edge of a steel plate or strip 26, curved to conform to the curvature of the frame and fastened with screws 27.

A modified construction of the clamps for attaching the handle to the frame is shown in Figs. 13 and 14. Here the clamps 28 are tightened on the frame by two bolts 29 each, and the end of the angle bar 6 is fitted between the bolts 29 being fastened by a bolt 5.

Important advantages of my rake are that it is of a very light, simple and cheap construction, can be easily operated by one man for gathering light, bulky and fluffy refuse, such as dead leaves, cut grass, etc., the curved shape of the teeth permitting to gather a large volume before unloading, the shoes preventing the points of the teeth to drag in the earth.

The construction of my rake can be further simplified by welding various parts together.

The teeth may be stiffened by a wire 31 stretched between the legs 2 and passing through holes 32 in the legs. The teeth may be spot welded to this wire, or they may be held by a second wire 33 twisted around the wire 32 and around the teeth. There may be several holes 32 in each leg in order to place the wire 31 at the desired height, or to employ more than one stiffening wire. This wire also serves to keep the teeth separated at their respective distances. The ends of the wire 31 can be also welded to the frame.

I claim as my invention:

1. A rake comprising a tubular frame having a horizontal portion and end portions, the ends of the frame being bent down so as to form legs adapted to slide on the ground, a handle extending from the frame, the horizontal portion of the frame having a plurality of holes for curved resilient teeth extending to the ground between the legs, the teeth being bent at the points of emergence from the holes, and means to fasten the ends of the teeth to the frame at the opposite sides of the holes.

2. A rake comprising a tubular frame having a horizontal portion and end portions, the end portions being bent down so as to form legs adapted to slide on the ground, the horizontal portion having a plurality of holes, curved resilient teeth fitted by their upper ends in the holes in the frame, the lower ends of the teeth extending to the ground, the teeth being bent at the points of emergence from the holes and fastened to the frame at the opposite points, a handle extending from the frame, and sliding loops formed of metal strips and fitted over the lower end portion of the teeth.

LOUIS OTTO E. ROESSEL.